United States Patent

Wang et al.

[11] Patent Number: 6,072,786
[45] Date of Patent: Jun. 6, 2000

[54] METHOD FOR ACQUISITION OF SPOTBEAM BEACON FREQUENCY WITHIN A SATELLITE COMMUNICATIONS SYSTEM

[75] Inventors: Yi-Pin Eric Wang, Cary; Wayne Stark, Chapel Hill, both of N.C.

[73] Assignee: Ericsson Inc., Research Triangle Park, N.C.

[21] Appl. No.: 08/874,047

[22] Filed: Jun. 12, 1997

[51] Int. Cl.[7] .......................... H04B 7/185; H04B 7/212; H04B 7/19

[52] U.S. Cl. .......................... 370/324; 370/316; 370/509; 455/12.1; 455/13.2

[58] Field of Search .................. 370/316, 324, 370/319, 350, 491, 503, 509, 321, 347, 514; 375/354, 364, 365; 455/427, 429, 12.1, 13.2, 450, 452, 453

[56] References Cited

U.S. PATENT DOCUMENTS

| | | | |
|---|---|---|---|
| 3,879,581 | 4/1975 | Schlosser et al. | 455/12 |
| 4,262,356 | 4/1981 | Lautier et al. | 455/12 |
| 4,425,639 | 1/1984 | Acampora et al. | 455/12 |
| 5,383,225 | 1/1995 | AguirRe et al. | 375/106 |
| 5,596,315 | 1/1997 | Olds et al. | 340/825.03 |
| 5,638,399 | 6/1997 | Schuchman et al. | 455/13.2 |
| 5,642,358 | 6/1997 | Dent | 370/323 |
| 5,805,646 | 9/1998 | Wang | 375/354 |
| 5,818,885 | 10/1998 | Kim | 375/354 |
| 5,838,745 | 11/1998 | Wang et al. | 375/364 |
| 5,875,182 | 2/1999 | Hatzipapafotiou | 370/350 |

FOREIGN PATENT DOCUMENTS

| | | |
|---|---|---|
| 0 257 634 A2 | 8/1987 | European Pat. Off. . |
| 2 303 764 | 2/1997 | United Kingdom . |
| WO 94/15412 | 7/1994 | WIPO . |
| WO 96/13946 | 5/1996 | WIPO . |

OTHER PUBLICATIONS

Asia Cellular Satellite System SAIS: Functions Related to User Terminal (UT) in Idle Mode (SAIS 03.22) Lockheed Martin, Jun. 1996, SAIS 03.22, PS–SAI13100 Rev. A.

Synchronization Method, and Associated Circuitry, for Improved Synchronization of a Receiver With a Transmitter Using Early–Late Testing During Coarse Synchronization by Eric Wang, Ericsson Inc.

*Primary Examiner*—Hassan Kizou
*Assistant Examiner*—Hanh Nguyen
*Attorney, Agent, or Firm*—Jenkens & Gilchrist, P.C.

[57] ABSTRACT

A method for acquiring a spotbeam beacon frequency is disclosed. The method comprises a fast synchronization procedure wherein the beacon frequency of the spotbeam is first acquired using a carrier acquisition process. A coarse time acquisition procedure is then performed on the acquired beacon frequency followed by a performance of a fine time and frequency acquisition process. The entire process enables spotbeam beacon acquisition in a range of approximately 2.7–27 seconds.

23 Claims, 4 Drawing Sheets

METHOD FOR ACQUISITION OF SPOTBEAM BEACON FREQUENCY WITHIN A SATELLITE COMMUNICATIONS SYSTEM

BACKGROUND OF THE INVENTION

1. Technical Field of the Invention

The present invention relates to satellite telephone communication systems, and more particularly, to a method for acquiring a spotbeam beacon frequency within a satellite communications system.

2. Description of Related Art

The next area of major development within wireless communication systems will likely involve the use of satellite telephones. Satellite-cellular communication systems, such as the Association of SouthEast Asian Nations' (ASEAN) Cellular Satellite (ACeS) system which is designed to provide telephone coverage by use of a geostationary satellite, have been proposed which, when implemented, shall permit a user to communicate telephonically by way of the satellite-cellular communication system when positioned at almost any location. By transmitting down-link signals between a satellite-based transceiver and the radiotelephone and up-link signals between the radiotelephone and the satellite-based transceiver, telephonic communication shall be possible between the radiotelephone and the satellite-based transceiver. By effectuating additional communication links between the satellite-based transceiver and a ground station, the user of the radiotelephone shall be able to communicate telephonically with another party by way of the ground station and the satellite-based transceiver.

Because of the inherent efficiencies of digital communication techniques, many already-installed cellular communication networks have been converted, and many newly-proposed cellular communication systems, such as the ACeS system, are being designed, to utilize digital communication techniques. Other communication systems similarly utilize, or are planned to be converted to or to utilize, digital communication techniques.

To function properly, particularly when the communication system utilizes digital communication techniques, the radiotelephone must be synchronized with a network station of the cellular communication network. Conventionally, synchronization signals are transmitted by the network station to the radiotelephone to synchronize the radiotelephone with the network station. Other communication systems similarly utilize conventional, synchronization signals for similar purposes.

In a TDM communication system, such as a time division multiple access (TDMA) system, communication is effectuated by the use of frames. In TDMA, a given frequency band is divided into a series of discrete frames each having a series of discrete timeslots therein, each timeslot for use by a different subscriber. Although many systems utilize eight timeslots per frame, ACeS provides for multiple users per time slot, effectively becoming a 16- or 32-slot system. During each timeslot, information may be transmitted in burst form in accordance with a particular multiframe configuration. A normal burst is the transfer of speech or data information. Other burst types include high-power synchronization bursts, groups of which form the aforementioned synchronization signals, which are preferably unevenly spaced across many frames within a multiframe, i.e., 102 consecutive frames in the ACeS system. The initial high-power synchronization burst in such a signal, however, is placed at the start of the first frame in a multiframe, signaling the multiframe boundry, and the remaining synchronization bursts, usually three, which could constitute high-power broadcast bursts, are unevenly spaced from the initial sync burst within the multiframe by known offsets.

It is readily apparent, however, that a radiotelephone or cellular phone, upon initial power up, is not synchronized with the digital bit stream emanating from the transmitter and must ascertain the multiframe boundry, i.e., the start of the initial synchronization burst, within that bit stream. Once the first sync burst and the multiframe boundry are found, the receiver may then quickly get in sync with the transmission. However, many multiframes of the transmission may transpire and a significant number of processing steps performed before synchronization is achieved even without the presence of interfering signals.

Conventionally, two types of synchronization are performed: coarse and fine. Coarse synchronization is designed to narrow the bit stream selection to a particular portion of consecutive bits hopefully containing the initial high-power sync burst, i.e., the multiframe boundry. Fine synchronization then determines the exact location of the initial sync burst within that portion by correlating or matching a segment of the selected consecutive bits to a bit pattern, and shifting the segment bit-by-bit until correlation and synchronization are achieved.

Control channels between an orbiting satellite and a mobile station telephone are enabled through a beacon channel providing general information to a mobile station and enabling initial carrier acquisition. Interaction between the satellite and the mobile station requires that the mobile station acquire a fix upon the beacon frequency associated with the spotbeam within which the mobile station is located. The spotbeam comprises a focused antenna pattern transmitted from a satellite to a limited geographical area. The spotbeam enables transmission of signals from a satellite to a well-defined area in which the mobile station is located.

Acquisition of the spotbeam by a mobile station enables initiation of connection procedures. Connections occur via a short or normal spotbeam selection process. For a short spotbeam selection process which utilizes prestored information or user interaction within an ACeS system, acquisition times of up to two minutes are allowed. For a normal spotbeam selection process which does not utilize any prestored spotbeam information or user interaction, acquisition times of up to twelve minutes are allowed.

Due to a lack of coordination of frequency planning throughout satellite communication service areas, up to 140 different frequencies for an ACeS system (the number of frequencies may vary depending on the system used) may be used as a spotbeam beacon frequency. Each spotbeam may have a unique beacon frequency. Thus, for normal spotbeam beacon frequency selection processes, the mobile station must search through over 140 different beam frequencies to determine the beacon frequency for the mobile station.

Evaluation of existing initial coarse synchronization procedures within an ACeS system reveal that in order to provide a 28 dB link margin over an additive white guassian noise (AWGN) channel, five multiframes of sync time are required to achieve a better than 99% coarse synchronization success rate. Proposed synchronization schemes require 114 seconds for short spotbeam selection processes and 729 seconds for normal spotbeam selection processes. Though the sync time achieved by existing schemes meets the short spotbeam selection process requirements and is close to meeting normal spotbeam selection process requirements, there is a need to significantly reduce the sync times to make satellite mobile stations even more effective.

SUMMARY OF THE INVENTION

The present invention overcomes the foregoing and other problems with a method for acquiring a spotbeam beacon frequency within a satellite communication system. Initially, a list of candidate frequencies is compiled. This list may comprise a list of most recently used frequencies or may be selected from a preestablished hierarchy of frequencies. The list of candidate frequencies is processed to establish the largest slot metric for each candidate frequency over a particular period of time.

The candidate frequencies are divided into two frequency groups based upon the largest slot metric determined for each candidate frequency. The largest slot metric for each frequency group (the group metric) is selected from the slot metrics associated with each frequency in the group. The group metrics are used to compute a ratio wherein the larger one of the group metrics is used as a numerator and the smaller one of the group metrics is used as a denominator within the ratio. This ratio is compared to a predetermined threshold value which establishes the minimum ratio level needed to determine if the beacon frequency is within the currently selected frequency group. If the ratio exceeds the threshold value, the frequency having the largest slot metric within the group of candidate frequencies is selected as the beacon frequency. Otherwise, a next group of candidate frequencies is selected, and the above process is repeated until a ratio is found which exceeds the preselected threshold value.

Once the spotbeam beacon frequency has been located, a fast coarse time acquisition process is performed on the frequency. Finally, a fast fine time and frequency acquisition process is performed on the beacon frequency. The fast acquisition process of the present invention is effect for a majority of users within a link margin smaller than the link margin of existing systems.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
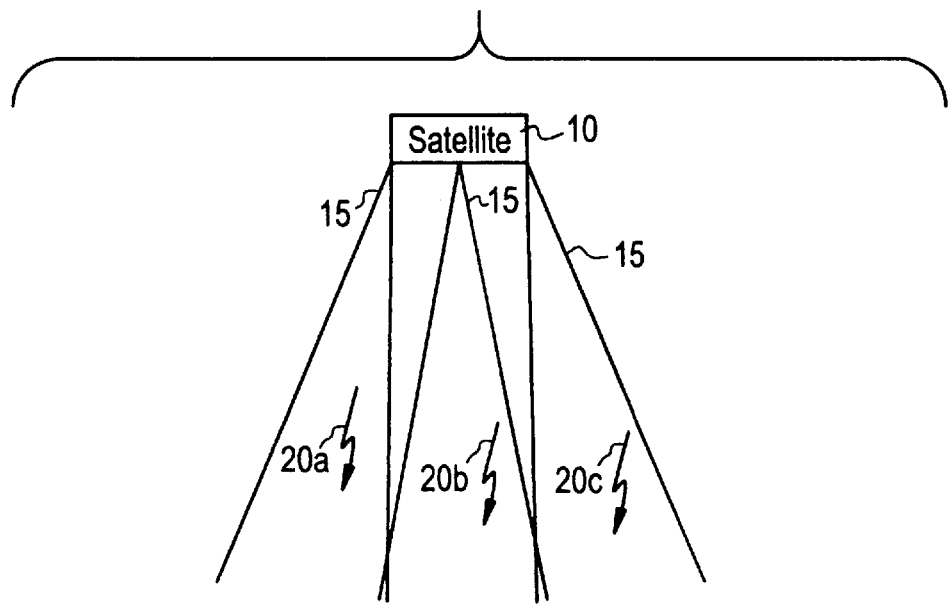
FIG. 1 is a block diagram of a satellite communications system incorporating the present invention.
Figure 1:
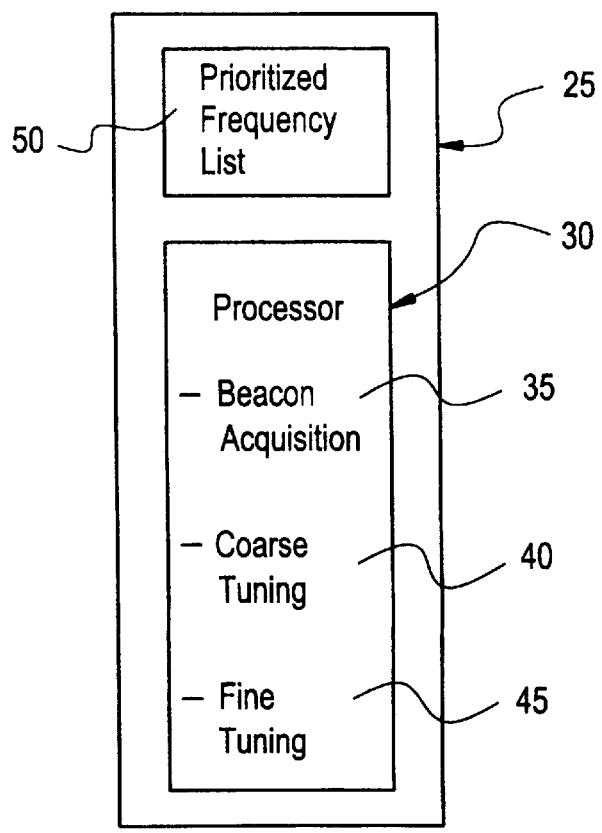

Referring now to the drawings, and more particularly to FIG. 1, there is generally illustrated components of a satellite communication system. A satellite 10 in geo-synchronous, low earth or medium earth orbit provides a number of spotbeams 15 providing communications to a number of selected location areas. Each of the spotbeams 15 is a focused antenna pattern transmitted to a limited geographic area. The spotbeams 15 are used by satellites 10 to deliver a signal to a geographically well-defined area. Within each spotbeam 15 is transmitted a beacon frequency 20a, 20b, 20c . . . enabling the satellite 10 to form a communications link with a mobile station 25 for transmitting control channel information between the satellite 10 and the mobile station 25. Each beacon frequency 20 is different for each spotbeam 15.

The communications link between the mobile station 25 and the satellite 10 is initiated upon activation of the mobile station 25. The mobile station 25 includes a processor 30 including circuits for acquiring the beacon frequency 35, for performing coarse adjustments 40 and for performing fine adjustments 45 to tune and synchronize the mobile station to the beacon frequency and to achieve time synchronization between the mobile station 25 and the satellite 10. The list of candidate beacon frequencies 35 is stored within a prioritized frequency list 50 including all possible beacon frequencies listed in priority order. The priority order of the beacon frequencies may be based upon the most recently accessed frequencies according to a predetermined priority.

Figure 2:
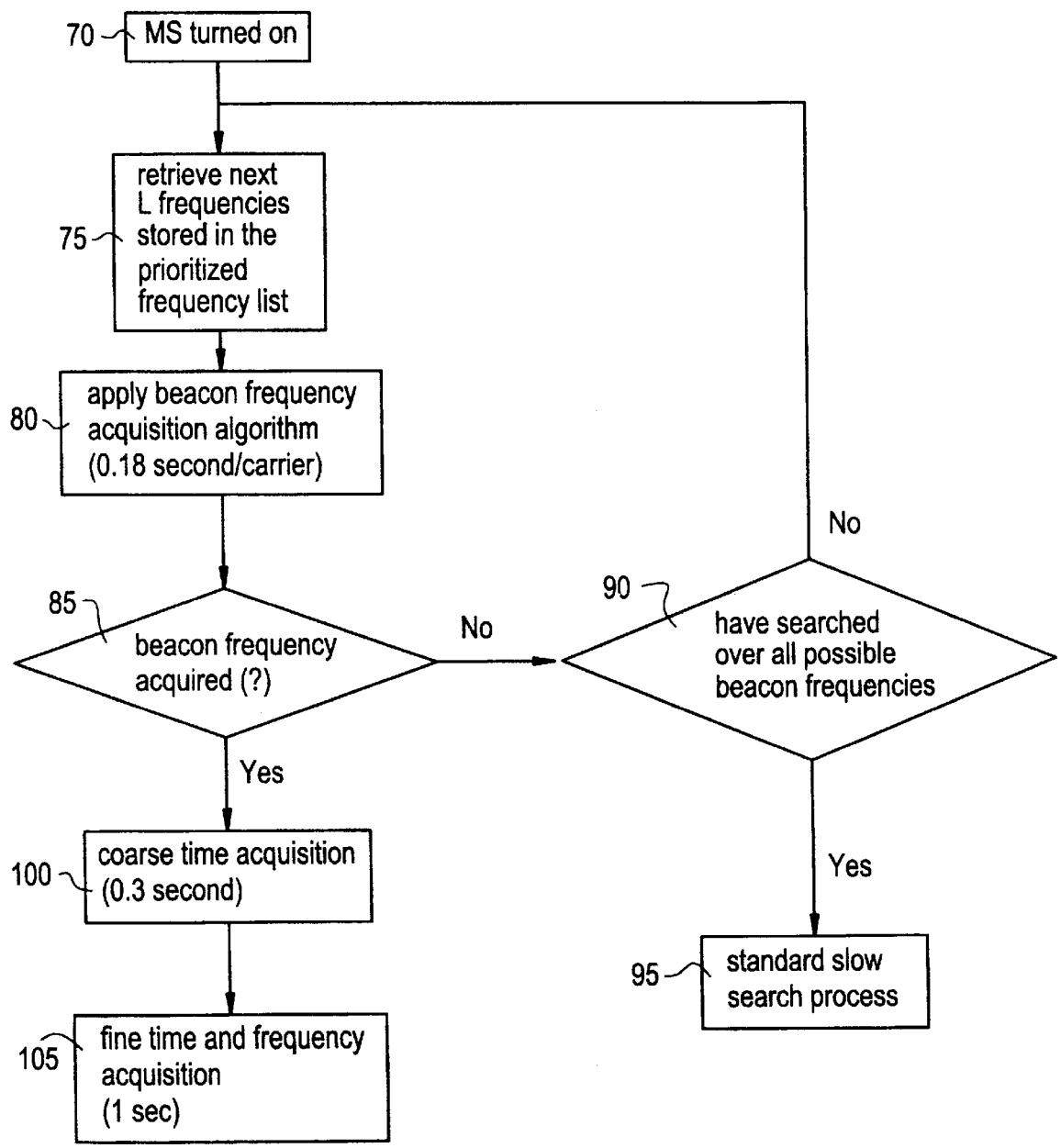
FIG. 2 is a flow diagram of a beacon frequency acquisition procedure.

Referring now to FIG. 2, there is illustrated a method for acquiring the beacon frequency according to the present invention. Once the mobile station 25 is turned on at step 70, the mobile station scans through a first set of L frequencies retrieved from the beginning of the prioritized frequency list 50 stored within the mobile station at step 75. These L frequencies may include frequencies which were most recently found to be a beacon frequency or may comprise a set list which is always accessed in a predetermined order. A beacon frequency acquisition program is activated at step 80 to locate the spotbeam beacon frequency 20. Inquiry step 85 determines whether or not the beacon frequency has been acquired. If not, an inquiry is made at step 90 to determine whether or not all possible beacon frequencies have been searched from the priority frequency list 50. If so, control passes to step 95 and a standard slow search process is performed for the beacon frequency. Otherwise, control passes back to step 75, and the next L frequencies are retrieved for processing by the beacon frequency acquisition algorithm.

If the beacon frequency has been acquired at step 85, the processor 30 proceeds to a fast coarse time acquisition process at step 100 to generally locate the initial high-power sync burst, i.e., the multiframe boundry. The process scans over a 62 frame window for this task. A sixty-two frame window is used to assure detection of at least two high-power synchronization bursts. If a multiframe configuration other than an ACeS configuration was used, any number of frames may be scanned as long as at least two high-power sync bursts are detected. Within the 62 frame window, the metric for each slot is calculated. The slot metrics and knowledge of spacing between high-power synchronization bursts may then be used to generally locate the control channel multiframe boundry using known techniques.

Assume $s_i$ equals the spacing between the i-th high-power synchronization burst and a previous synchronization burst. For example, in an ACeS system, the first four spacings(i=1, 2, 3, and 4) are $s_1=168, s_2=176, s_3=312,$ and $s_4=160$. The phone calculates the following metric:

$$B_1^i = P_1^1 + P_{1+S_i}^1$$

where $P_1^1$ is a slot metric for the first carrier for $1=1, 2, \ldots, M$ and $i=1, 2, 3,$ and 4. An early-late testing technique, described in Applicant's Copending application Ser. No. 08/727,370, (Attorney Docket Number 27951/131) which is hereby incorporated by reference, may be used to differentiate the high-power synchronization burst from the high-power paging alert bursts. This differentiation is necessary since synchronization may be prevented where other nonsynchronization bursts having the same power level, such as high-power paging alert bursts, are transmitted on the same carrier. The difficulty arises from the fact that the receiver cannot distinguish between high-power synchronization bursts and other types of high-power bursts. Thus, the receiver cannot identify the multiframe boundry and achieve synchronization. The fine time and frequency acquisition processes may then be performed at step 105 to determine the exact location of the initial high-power sync burst to complete the synchronization process.

Figure 4:
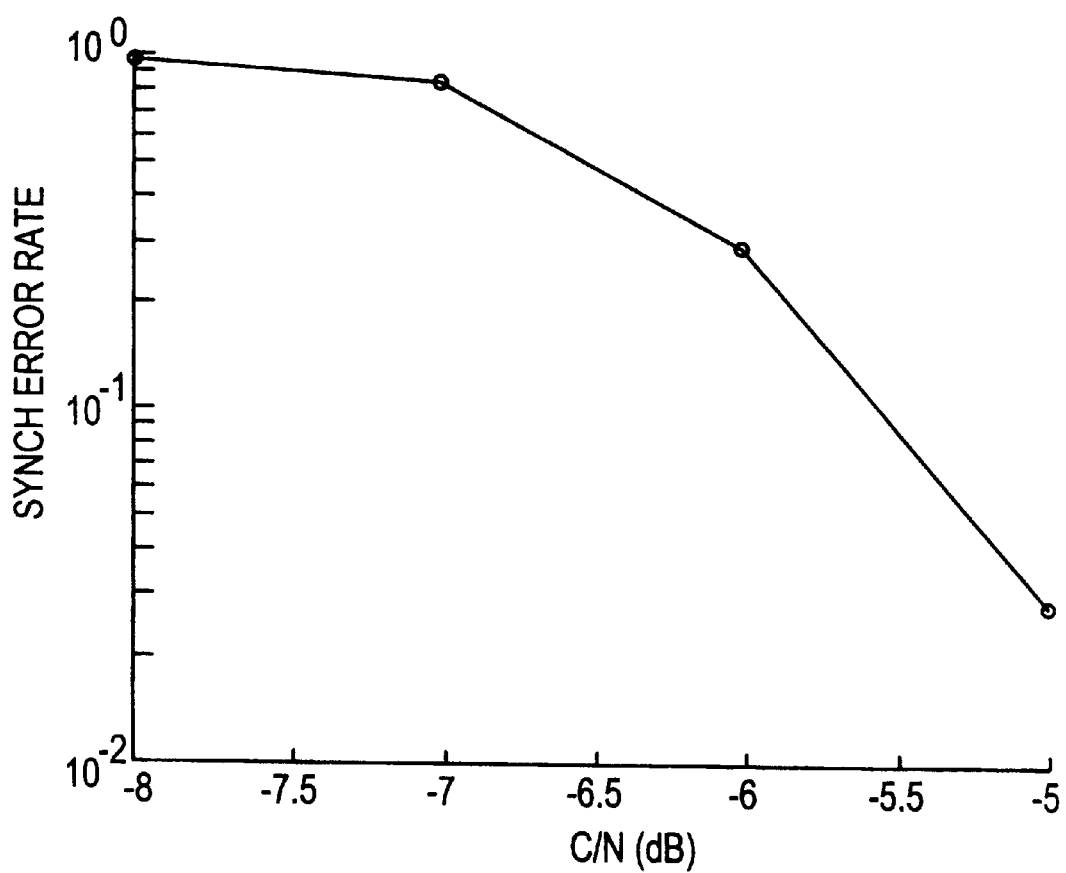
FIG. 4 is an illustration of the performance of a fast coarse time synchronization algorithm.

FIG. 4, illustrates the performance of the fast coarse time synchronization algorithm. It can be seen that less than 3% sync error rate can be achieved from a signal-to-noise ratio (C/N) greater than −5dB. This situation will cover a majority of the users of an ACeS system. With a search frequency list containing 8 frequencies, the minimal time needed to acquire coarse time sync is only 1.757 seconds or approximately 3.7 multiframes. A timeframe is 0.577 mS long, 8 slots comprise a 2.3 mS frame and 102 frames comprise a 0.47 second multiframe. For a worst case scenario, where a mobile station must search through all 140 carrier frequencies to find the right beacon frequency, only 26 seconds or approximately 55.3 multifames would be needed. Assuming that the mobile station needs two more control multiframes to achieve the fine time and frequency synchronization, the total sync time with this invention is between 2.7 and 27 seconds. This is greatly improved from the 2-minute to 12-minute times required for beacon frequency synchronization for a previous system having C/N of −8 dB.

Figure 3:
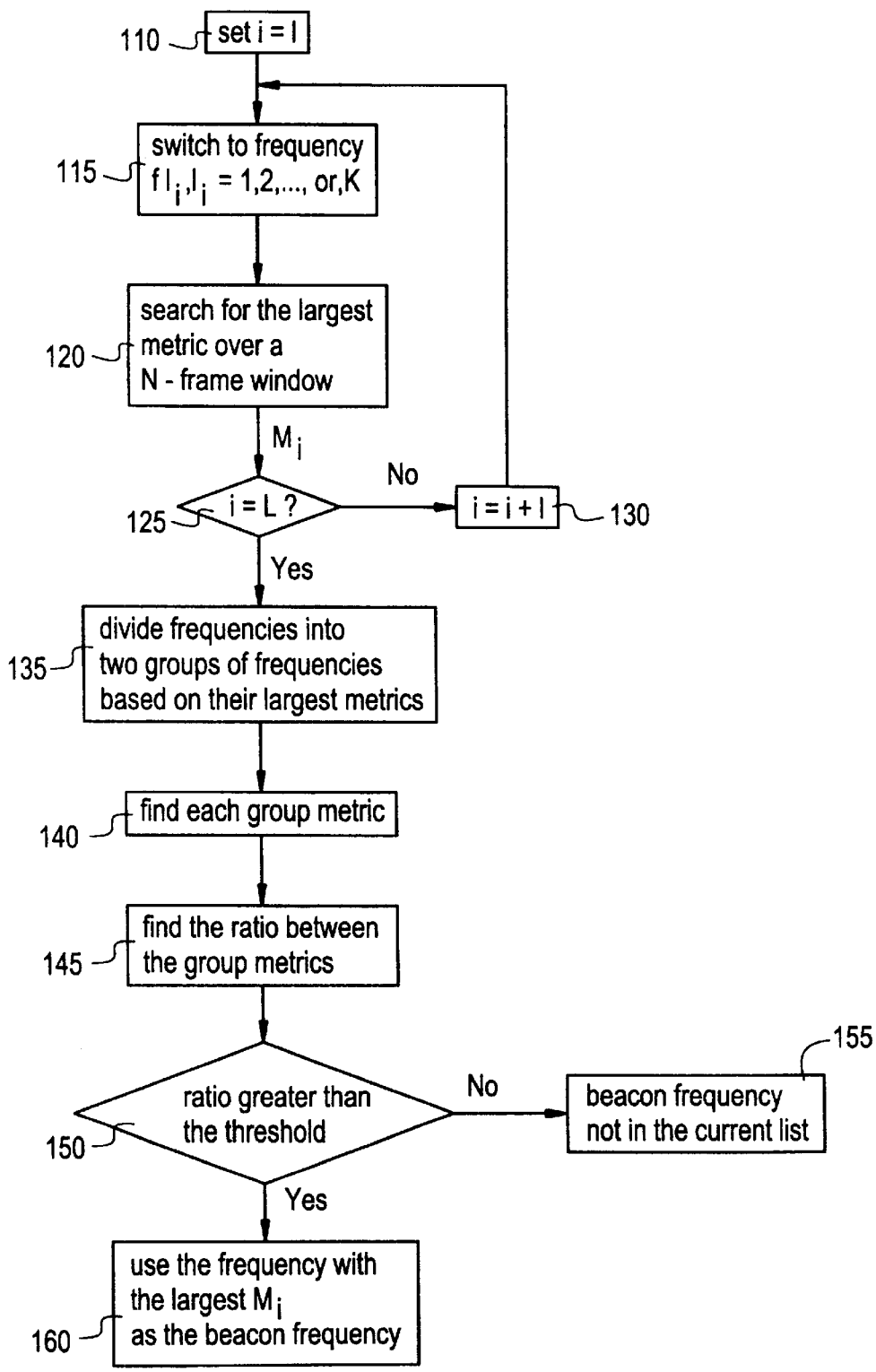
FIG. 3 is a flow diagram of a beacon frequency acquisition algorithm.

Referring now to FIG. 3, there is illustrated the beacon frequency acquisition algorithm. The beacon frequency acquisition algorithm finds the largest accumulated power in a slot at each frequency over a 40 frame window. In ACeS, each control channel multiframe has four high-power synchronization bursts located at slot 0 of frames 0, 22, 61 and 81. Thus, by searching for the largest accumulated power in a slot over a 40 frame window, one can utilize the energy contribution from at least one high-power synchronization burst.

Initially, at step 110, a counter i is set equal to one. At step 115, a switch to a first frequency is made. The largest metric for the present frequency is then calculated over the N (40) frame window. This is accomplished by letting $r_i^j$ be the received signal sample at time iT at frequency $f_j$, where T is the bit duration. The accumulated energy in the l-th slot at frequency $f_j$ equals:

$$p_l^j = \sum_{i=(l-1)N+1}^{lN} |r_i^j|^2, l = 1, 2, \cdots, M$$

where N is the number of bits per slot; and

M is the total number of slots in the search window. In an ACeS system, for a 40 frame window, M=320 (i.e., 8 slots per frame for a 40 frame window totaling 320 slots). The largest accumulated power in a slot at frequency $f_j$ can be expressed as:

$$A^j = \max_{l=1,\cdots,M} p_l^j.$$

$p_1^j$ and $A^j$ are referred to as the slot metric and carrier metric, respectively. It may be assumed that $A^1 > A^2 > \ldots > A^L$. Inquiry step 125 determines if counter i=equals the number of frequencies within the candidate frequency list, and if not, increments i at step 130 to enable switching to the next frequency at step 115.

If the largest slot metrics for all frequencies within the candidate frequency list have been determined, control passes to step 135 wherein the set of L candidate frequencies is partitioned into two subsets $S_1$ and S2 where $$S_1 = \{f_1, f_2, \ldots, f_{k_1}\};$$

and $$S_2 = \{f_{k_1+1}, f_{k_1+2}, \ldots, f_L\}$$

Using these equations the frequencies with largest metrics are placed in $S_1$, and the frequencies with smaller metrics are placed in $S_2$. The group metrics for each of the two subsets $S_1$ and $S_2$ are determined at step 140. The group metrics $G_1$ and $G_2$ associated with $S_1$ and $S_2$ are defined as:

$$G_1 = \max_{1=1,\ldots,k_1} A^1$$

$$G_2 = \max_{1=k_1+1,\ldots,L+1} A^1.$$

or in an alternate embodiment;

$$G_2 = \max_{1=k_1+1,\ldots,L} A^1.$$

The ratio between the group metrics $G_1$ and $G_2$ is calculated at step 145 and used to determine whether $f_1$ (which has the largest slot metric) is the beacon frequency used by the current spotbeam. The ratio is calculated according to the equation $$\gamma = \frac{G_1}{G_2}.$$

Inquiry step 150 determines if the ratio γ is greater than a predetermined threshold value. If so, $f_1$ is used as the beacon frequency at step 160, and the initial acquisition process moves on to step 100 of FIG. 1. On the other hand, if the ratio γ is less than or equal to the predetermined threshold value, this indicates the beacon frequency is not within the current set of candidate frequencies, and the next set of candidate frequencies must be accessed as described in FIG. 1. For this case, the mobile station sets $A^{L+1}=A_1$ and obtains another set of candidate frequencies for beacon frequency acquisition.

The motivation for using the ratio γ of group metrics for a decision on carrier frequency acquisition is mainly for a scenario where a user is in the boundry of the coverage area of several spotbeams. In this case, more than one frequency could yield large carrier metric having nearly equal values. Therefore, if we merely took the ratio of two slot metrics $A_1$ and $A_2$, a ratio near one would be provided and we could miss detecting a beacon frequency.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for acquiring a spotbeam beacon frequency at a mobile station within a satellite communications system, comprising the steps of:
   a) accessing at least one set of candidate spotbeam beacon frequencies;
   b) dividing the at least one set of candidate spotbeam beacon frequencies into a plurality of groups; and
   c) using group metrics of the plurality of groups to detect the spotbeam beacon frequency
   d) determining a position of a multiframe boundary within the detected spotbeam beacon frequency.

2. The method of claim 1 wherein the step of determining further includes the steps of:
   performing coarse time acquisition on the detected spotbeam beacon frequency to select a group of bits containing the multiframe boundry; and
   performing fine time acquisition on the detected spotbeam beacon frequency to detect the position of the multiframe boundry within the group of bits.

3. The method of claim 2 wherein the step of performing fast coarse time acquisition is performed over a frame period including at least two high-power synchronization bursts.

4. The method of claim 1 wherein the plurality of groups comprise a first and a second group.

5. The method of claim 1 wherein the step of using further includes the steps of:
   calculating a ratio between group metrics of the first and the second groups;
   comparing the calculated ratio to a predetermined threshold; and
   if the calculated ratio exceeds the predetermined threshold, selecting the frequency associated with a largest slot metric as the spotbeam beacon frequency.

6. The method of claim 5 wherein the step of calculating comprises the steps of:
   determining the group metrics for the first and the second groups, wherein the group metrics comprise the largest slot metric within each of the groups; and
   dividing the largest group metric by the smaller group metric to determine a ratio between the two group metrics.

7. The method of claim 5 further including the steps of:
   accessing a second set of candidate frequencies if the calculated ratio does not exceed the predetermined threshold value; and
   repeating steps a)–c) for the second set of candidate frequencies.

8. The method of claim 1 wherein the step of dividing comprises the steps of:
   determining a largest slot metric for each frequency in the at least one set of candidate frequencies; and
   dividing the at least one set of candidate frequencies into the groups based on the largest slot metric associated with each of the frequencies.

9. The method of claim 8 wherein the step of determining comprises the step of determining a power of a received signal accumulated over a slot.

10. The method of claim 8 wherein the step of determining comprises the step of determining an accumulation of a logarithm of a received signal power over a slot.

11. The method of claim 8 wherein the largest slot metric for each frequency is determined over a selected search window.

12. The method of claim 11 wherein the selected search window covers at least one high-power synchronization burst.

13. The method of claim 11 wherein the selected search window is 40 frames long.

14. A method for acquiring a spotbeam beacon frequency at a mobile station within a satellite communications system, comprising the steps of:
   determining a group metric for each of a first and a second group of spotbeam frequencies within a plurality of candidate spotbeam beacon frequencies, wherein the group metrics comprise a largest slot metric within a group;
   dividing a larger group metric of the first and second groups of spotbeam frequencies by a smaller group metric of the first and second groups of spotbeam frequencies to determine a ratio between the group metrics;
   comparing the ratio to a predetermined threshold value; and
   selecting one of the plurality candidate spotbeam frequencies having a largest slot metric as the spotbeam beacon frequency if the ratio exceeds the predetermined threshold value.

15. The method of claim 14, further including the steps of:
   performing coarse time acquisition on the selected spotbeam beacon frequency over a frame length including no more than two high-power synchronization bursts; and
   performing fine time frequency acquisition on the detected spotbeam beacon frequency after coarse time acquisition.

16. The method of claim 14 wherein the step of determining comprises the steps of:
   determining a largest slot metric for each of the plurality of frequencies in the at least one set of candidate frequencies;
   dividing the at least one set of candidate frequencies into the first and the second groups based on the largest slot metric associated with each of the plurality of frequencies.

17. The method of claim 16, further including the steps of:
   accessing a second set of candidate frequencies if the calculated ratio does not exceed the predetermined threshold; and
   repeating steps a)–g) for the second set of candidate frequencies.

18. The method of claim 15, further including the steps of:
   accessing a second set of candidate frequencies if the determined ratio does not exceed the predetermined threshold value; and
   repeating steps a)–b) for the second set of candidate frequencies.

19. A method for acquiring a spotbeam beacon frequency at a mobile station within a satellite communications system, comprising the steps of:
   a) accessing at least one set of candidate spotbeam beacon frequencies;
   b) determining a largest slot metric for each spotbeam beacon frequency in the at least one group of candidate spotbeam beacon frequencies;
   c) dividing the at least one group of candidate spotbeam beacon frequencies into a first and a second group based on the largest slot metric associated with each of the spotbeam beacon frequencies;

d) designating the largest slot metric within each of the first and second groups as the group metric for the first and second groups, respectively;

e) calculating a ratio between the group metrics of the first and the second groups;

f) comparing the calculated ratio to a predetermined threshold value; and g) selecting one of the candidate spotbeam beacon frequencies having a largest slot metric as the spotbeam beacon frequency if the ratio exceeds the predetermined threshold.

20. The method of claim 19, further including the steps of:

performing coarse time acquisition on the selected spotbeam frequency; and performing fine time frequency acquisition on the detected spotbeam beacon frequency after coarse time acquisition.

21. The method of claim 19 wherein the slot metric comprises a power of a received signal accumulated over a slot.

22. The method of claim 19 wherein the step of determining comprises the step of determining an accumulation of a logarithm of a received signal power over a slot.

23. The method of claim 19 wherein the largest slot metric for each frequency is determined over a selected search window.

* * * * *